United States Patent Office 3,416,902
Patented Dec. 17, 1968

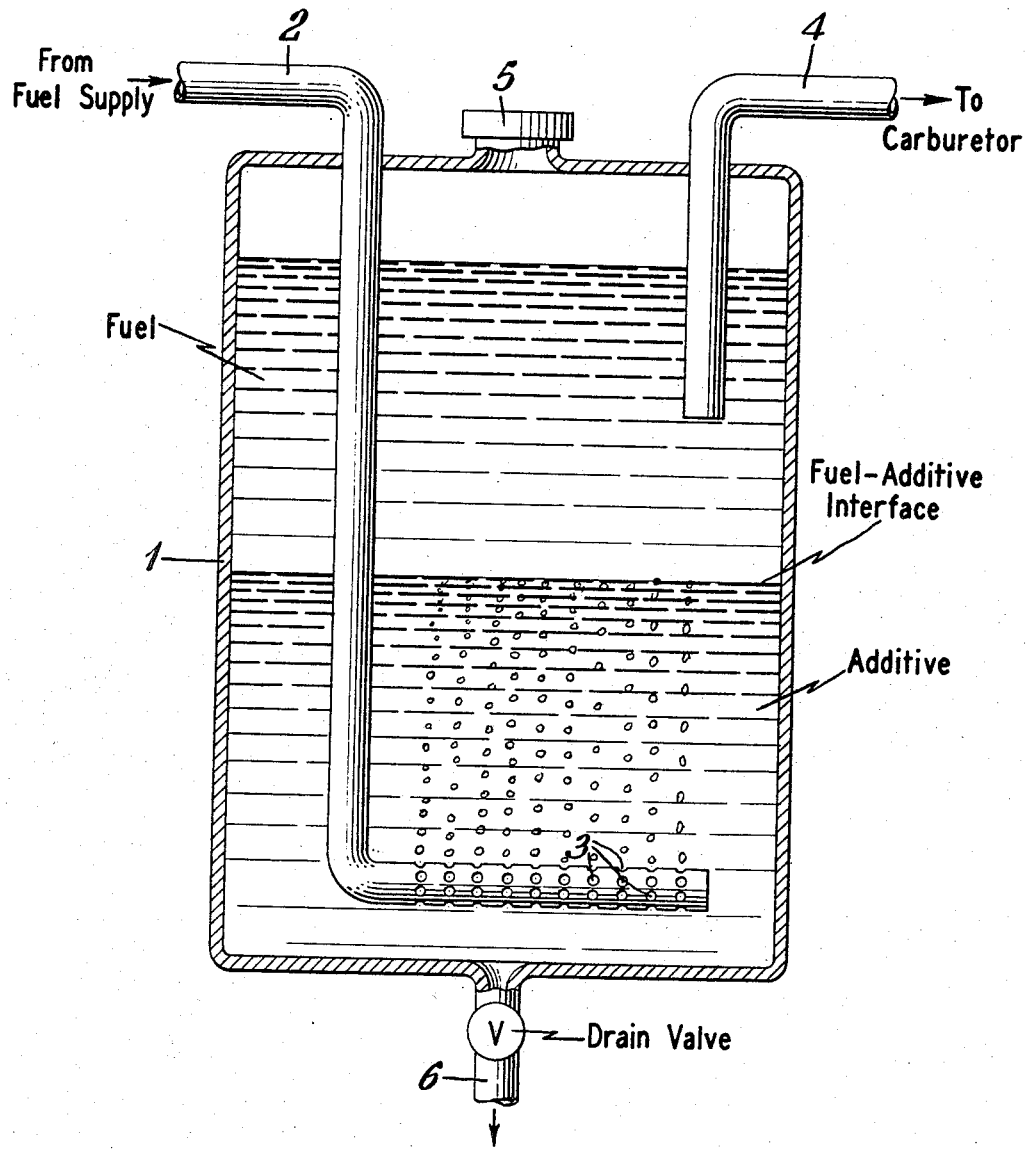

3,416,902
FUEL ICING PREVENTION
John R. Anderson, Mount Kisco, and Edward P. Cass, Yorktown Heights, N.Y., assignors to Union Carbide Corporation, a corporation of New York
Filed Oct. 31, 1963, Ser. No. 320,319
7 Claims. (Cl. 44—72)

ABSTRACT OF THE DISCLOSURE

The invention relates to a method for preventing the formation of ice in hydrocarbon fuels by substantially saturating the fuels with an excess amount of a largely insoluble additive so as to provide a separate phase between the additive and the fuel.

---

This invention relates to the treatment of hydrocarbon fuels. More particularly, this invention is directed to a procedure for treating hydrocarbon fuels with additives to hinder the formation of ice in fuel storage facilities, in fuel transport lines or in the engine in which the fuel is consumed.

Commercial hydrocarbon fuel compositions are invariably contaminated with small amounts of water which become dissolved or dispersed in the fuel during blending, storage or shipment to the consumer. Water will also be absorbed by the fuel from the atmosphere. Accordingly, when a fuel so contaminated is subjected to subfreezing environments the water contained therein can freeze out resulting in the formation of ice particles.

Although in many instances ice formation in hydrocarbon fuel can be tolerated and poses no problem, sometimes ice particles can cause maloperation of the engine which is bothersome to the operator and potentially hazardous. The fuel systems of hydrocarbon fueled engines are often provided with a filter element such as a filter screen or a ceramic filter intermediate the storage tank and combustion zone. Fine ice particles will gather on these filters preventing the passage of fuel. This problem is often encountered in fuel systems of jet or turbine powered aircraft where high altitude conditions can result in a rapid cooling of the fuel to subfreezing temperatures.

A more commonly encountered problem of icing occurs in carburetors of hydrocarbon fueled engines, particularly automobiles. Under humid atmospheric conditions and at ambient temperatures of from 30° to about 60° F., a fuel composition evaporating in the carburetor before engine warmup is complete exerts a sufficient auto-refrigerative effect to depress the temperature of the carburetor and surrounding parts, and freeze the moisture present in the fuel as well as the atmospheric moisture in the incoming air stream. This can result in the formation of ice on the throttle plate and on the carburetor barrel, and after a time the ice-buildup restricts the air flow through the small clearance between the throttle plate and the carburetor wall causing the engine to stall. Such stalling will persist until warmup is complete.

Heretofore attempts have been made to solve this problem by incorporating into the hydrocarbon fuel an oil-soluble additive such as a glycol ether or the like, which was also soluble in water. However, the concurrent water and fuel solubility of these compounds renders them extremely susceptible to removal from the hydrocarbon phase by the leaching or extractive effect of water with which the hydrocarbon will inevitably come into contact. Thus, it became necessary to incorporate a large amount of additive in the fuel at the time of blending in order to insure the required anti-icing concentration would be present in the fuel at the time of use. This high proportion of additive is ostensibly uneconomical and despite excess does not insure that the proper concentration of additive will be in the fuel at the time of use.

It has now been discovered that the troublesome effects of ice formation in hydrocarbon fuel compositions may be obviated by treatment with an additive which is soluble in water but which is only sparingly soluble in the fuel. Such additives have not heretofore been considered usable and accordingly have not been employed. In accordance with this invention, the effects of icing in fuels may be obviated by contacting the hydrocarbon fuel with an excess of an additive which is sparingly soluble in the fuel so as to substantially saturate the hydrocarbon fuel with said additive.

Thus, in accordance with this invention, the hydrocarbon fuel composition is maintained in contact with an excess of a sparingly soluble additive or is contacted once or at a plurality of intervals as hereinafter provided during transport or storage with an excess of a sparingly hydrocarbon-soluble additive.

The instant invention comprehends a novel method for treating liquid hydrocarbon fuel compositions to prevent the formation of ice particles therein and to prevent the formation of ice in apparatus through which the said hydrocarbon fuel passes, which comprises contacting the said hydrocarbon with a sparingly hydrocarbon-soluble organic additive, in sufficient amount in excess of that which is soluble in the fuel as to maintain a separate phase of the sparingly hydrocarbon soluble additive in contact with the fuel.

The sparingly hydrocarbon soluble compounds which are advantageously employed in accordance with this invention include ethylene glycols of the formula

$$HO(CH_2CH_2O)_nH$$

having a molecular weight up to about 600. Preferred are ethylene glycols or polyethylene glycols where $n$ has a value from 1 to 6 such as ethylene glycol, diethylene glycol, triethylene glycol, tetraethylene glycol, and the like. Other additives which may advantageously be employed include propylene glycol, the ethanolamines such as monoethanolamine, diethanolamine and triethanolamine, the isopropanolamines such as monoisopropanolamine diisopropanolamine, and triisopropanolamine. Other sparingly soluble compounds which have been found to be effective are $\beta,\beta'$-dihydroxyethyl sulfide and aminoethylethanolamine.

These compounds, thus by virtue of their very slight solubility in hydrocarbon fuels will, when supplied to such fuels in excess of the amount soluble therein exist as a separate phase in contact with the fuel. Simultaneously, of course the fuel phase will tend to become saturated with the additive.

Although not essential in the practice of this invention, specific compounds which are totally miscible with water, the additive and the hydrocarbon fuel may be admixed with the additive to serve as a viscosity reducer for the additive and facilitate the handling thereof. Such compounds as methanol and ethanol, which have no anti-icing effect themselves, may be used for this purpose.

The additives contemplated for use in the present invention are, as hereinbefore stated, characterized by a very low solubility in gasoline. Depending upon the particular gasoline composition and the ambient conditions of temperature, the sparingly soluble additives of this invention may be soluble in the hydrocarbon fuel in an amount up to about 1000 parts per million and more generally about 500 parts per million. Nevertheless these additives provide effective protection against ice formation under most conditions in amounts as low as 50 parts per million. In general, the contact between the additive and the fuel as herein provided will result in a concentration of from about 50 to 500 parts per million of the sparingly hydrocarbon soluble additive.

These small concentrations of sparingly hydrogen-soluble additives in a hydrocarbon fuel composition appear to exert a dual effect to prevent the maloperation of the engine in which the fuel is employed. Initially, the additive will tend to depress the freezing point of any water dispersed or dissolved in the fuel, but also under extremely severe conditions the additives appear to have the effect of coating individual ice particles, preventing their agglomeration into a solid mass and rendering any accumulation of ice porous to the passage of air and fuel.

The use of sparingly hydrocarbon-soluble additives in accordance with this invention provides advantages not heretofore obtained by the art. Whereas prior art systems suffered the extraction of the additive from the fuel by water thus leaving the said additive useless in the aqueous phase; the instant invention comprehends using an excess of the sparingly hydrocarbon-soluble additive, thus maintaining an additive phase which will provide a sufficient driving force to saturate or substantially saturate the fuel with a sufficient level of additive to prevent icing, and simultaneously to extract water from the hydrocarbon fuel phase. Yet by virtue of the slight solubility of the additive in the fuel, the novel treatment method of this invention will not involve the expense which is incurred by using excessive amounts of additive. The slight solubility of the additive serves to meter just the necessary amount of additive into the fuel, while the ternary miscibility characteristics of the sparingly soluble additive with hydrocarbon and water make it possible for the additive to extract water from the fuel mixture.

Consonant with the instant invention, there is provided a novel method for treating fuels to obviate in-line icing, carburetor icing or the like. In one aspect the treatment may involve simply adding an excess of the additive to the fuel and maintaining this excess amount as a separate phase in a fuel storage facility or a transport vehicle. The fuel taken from such a storage reservoir is thus substantially saturated with additive and also very low in water content. Such a vessel may be refilled with fuel many times before the additive phase becomes so contaminated with water as to be ineffective in providing a sufficient amount of additive to the fuel. When the additive is used up or becomes substantially contaminated with water it is drawn off and replaced with fresh additive. Thus, in an automobile, the fuel tank itself may serve as the reservoir containing the excess of additive provided that the fuel line is so arranged that the lower additive phase will not be drawn into the engine.

In a second aspect, fuel in transport, either through a transport pipeline or through a fuel line in an engine may be treated to prevent the formation of ice particles therein by conducting the fuel through a separately maintained phase of the sparingly hydrocarbon-soluble additive, the said phase containing an amount of additive in excess of the amount necessary to saturate the fuel passing therethrough at any time. Thus, in the operation of a hydrocarbon fueled engine wherein a liquid hydrocarbon fuel is delivered through a conduit which contains an in-line filter or a carburetor or both, the invention provides the improvement of dispersing the fuel through a separately maintained additive phase, of sparingly hydrocarbon-soluble additive, the said phase containing an amount of additive in excess of the amount necessary to saturate the fuel passing therethrough at any time. As will become obvious from a consideration of the particular embodiment of the invention presented, the instant invention is singularly effective in preventing carburetor icing since the highest concentration of additive in the fuel is advantageously supplied at the time when it is most needed, i.e., during the startup period before the engine is warm, during which time carburetor icing or in-line icing is most likely.

A particularly preferred aspect of the invention is illustrated in FIGURE 1. The vessel 1 is adapted to be disposed in the fuel line of an internal combustion engine at a point prior to the carburetor and prior to the in-line filter. The fuel from the fuel storage tank is pumped through entry tube 2 to a point below the liquid level of the additive phase within the vessel. The fuel stream exists from tube 2 at the bottom thereof which is equipped with a dispersing head 3 having small holes therein. The fuel is dispersed into fine bubbles which, being substantially insoluble in the additive phase, rise through the additive phase forming an upper fuel phase saturated with additive. This fuel saturated with additive is then drawn off through exit tube 4 which extends below the level of the upper fuel phase for consumption in the engine. When the additive has been used up or, more likely, has been substantially contaminated with water extracted from the fuel the reservoir may be emptied through drain valve 6 and may be refilled with fresh additive through a fill hole 5 in the top of the container. The fill hole is capped at other times. Of course it is to be understood that other adaptations of this concept are deemed to be within the scope of the instant invention. For example, the vessel containing the additive may comprise a separate closed container which may be separately purchased in which the fuel entry tube and fuel exit tube may be inserted. For instance, a closed container with the additive already within may be provided. The container would then be adapted to accept the insertion of the entry and exit tubes by any suitable method such as puncture of the container top or the like. The container may then be used until the additive therein is consumed or contaminated whereupon it may be discarded and replaced.

It is readily observed that this vessel acts as an in-line scrubber for the fuel which extracts water from the fuel and retains it in the additive phase, and which serves to saturate or substantially saturate the fuel phase with additive. In addition, the needed concentration of additive is assuredly present in the fuel at the time of start up of the engine when icing is most likely to occur. Prior to start-up, the fuel phase and the additive phase in the vessel will have been in contact for the length of time since prior use of the motor, and thus in view of the great excess of additive present in the container, the fuel phase becomes saturated with additive. This fuel is the first supplied to the cold engine when the occurrence of icing is most likely. Under conditions of extended use of the engine, after operating temperature is achieved, the length of time during which the fuel is in contact with the additive is decreased as the throughput of fuel through the vessel containing additive increases. Under these latter conditions when icing is less of a hazard, the concentration of additive in the fuel and the amount of additive expended will be advantageously less.

It has been satisfactory to employ a reservoir of such size as contains approximately one pint of the additive and approximately one pint of the fuel although larger or smaller devices may be employed depending upon the size and fuel consumption of the engine. It is also pointed out that the use of such a reservoir is not deemed to be restricted to installation in fuel lines of hydrocarbon fuel and engines. Such a device may be advantageously employed in fuel pipeline transport equipment which contemplates subfreezing conditions, particularly if filtering is also involved.

The hydrocarbon fuels which may be treated in accordance with this invention are, in general, those which are established and are conventionally employed as fuels for spark-ignition engines, compression ignition engines, and jet and rocket propulsion engines, the latter including the gas turbine type of power plant, employed for automotive aircraft propulsion and more recently automotive purposes. As used herein, these petroleum hydrocarbons fall into several generally, defined classes of which the following are pertinent to the present invention (1) aviation gasoline, the petroleum fraction boiling between about 100° and 330° F., (2) motor gasoline, the petroleum fraction boiling between 85° and 430° F., and (3) kerosene and diesel fuel, the fraction boiling between about 300° and 625° F., and (4) jet fuel, the fraction boiling between about 100° and 600° F. and preferably between 150° and 550° F. All of these components may be made up of straight run, thermally cracked and/or catalytically cracked or reformed components. With particular reference to kerosene and jet fuels which are illustrative but not limitative of fuels which may be treated according to the instant invention, such products possess desirable characteristics of flammability, engine power requirements, freezing points, flash points, vapor loss, cost and availability which have rendered them most suitable for the fuel for jet aircraft.

Aviation kerosene is a blend of petroleum fractions and is made to meet a variety of specifications. The following data are presented to illustrate one particular commercial product.

| | |
|---|---|
| Distillation (20% evap.), ° F. max. | 392 |
| End point, ° F. max. | 572 |
| Residue, percent volume, max. | 2.0 |
| Loss, percent, max. | 1.5 |
| Sulfur, percent wt., max. | 0.2 |
| Freezing point, ° F. | −40 |
| B.t.u./lb. net, min. | 18,300 |
| Flash point, ° F. | 100 |

Similarly, turbojet fuels are blends of petroleum fractions and are made to meet a variety of specifications. The following data are presented to illustrate one particular product, namely, JP–4 which is a wide cut petroleum fraction covering the boiling range of both gasoline and diesel fuels.

| | |
|---|---|
| Distillation: | |
| (20% evap.), ° F. max. | 270 |
| (90% evap.), ° F. max. | 470 |
| Residue, percent volume, max. | 1.5 |
| Loss, percent, max. | 1.5 |
| Sulfur, percent wt., max. | 0.4 |
| Freezing point, ° F. | −76 |
| B.t.u./lb. net, min. | 18,400 |
| Flash point, ° F. | 10 |

Fuels of particular interest are those having a volatility such that the 50 percent distillation point falls below about 310° F. and which can be obtained from mineral oils or gaseous hydrocarbons derived from any source and by any of the known commercial methods of manufacture identified above or by polymerization, alkylation, hydrogenation and the like.

TEST PROCEDURE

To demonstrate the effective nature of various antistall additives a 1959 Buick Sabre engine (364 cubic inch displacement, 10.5:1 compression ratio) was coupled to a twenty horsepower induction motor. The induction motor is used to provide the load on the engine during periods of high speed operation.

The engine was equipped with a standard carburetor supplied with the engine. The carburetor was insulated from the heat of the engine to permit rapid testing inasmuch as the engine did not have to be cooled after each test.

The carburetor choke plate is fixed in the full-open position; fixing the choke in the full-open position allows visual observation of throttle plate icing and facilitates cleaning of the throttle plates between runs. The adapter which fits over the top of the carburetor is fitted with a window directly above the carburetor throat to permit observation of throttle plate icing when the engine is operating and is readily removable so that the throttle plates can be cleaned between runs.

The carburetor is enclosed in a vented transparent plastic box into which a secondary air stream is fed. This air stream can be as cool as the air being fed into the carburetor or can be warmed to simulate heat transfer from the engine.

An air treatment system supplies cool, humid air to the carburetor. Cooled air exiting from the cooling coils is passed through an insulated six-inch duct directly to the carburetor. Other cool air streams are fed through four-inch ducts to the two insulated fuel storage boxes and to the plastic box which encloses the carburetor.

Humidity is determined from a matched pair of wet and dry bulb thermometers graduated to 0.1° C., which are located in the air duct just prior to the carburetor. Humidity control is accomplished by varying the flow of steam to the air cooler intake. This assumes that the room air is deficient in moisture.

The test conditions are intended to simulate stop-and-go driving. A single cycle consists of 60 seconds operation at about 1800 r.p.m. and 6 horsepower engine loading, followed by a 30-second idle period. Each test consists of five such cycles or a total of five minutes high-speed operation and 2½ minutes at idle, except as interrupted by an engine stall. When stalling occurs, the engine is restarted immediately to 1800 r.p.m. and then cut back to idle for the remainder of the 30-second idle period. It is felt that the 7½ minute test period with no heat being supplied to the carburetor imposes more severe conditions than will normally be encountered in actual practice.

The throttle plate is manually positioned from a control arm mounted on an instrument panel; a flexible metal cable connects the control arm to the throttle arm. A micro-switch actuates the induction motor so that, at high engine r.p.m., the motor is used to load the engine. As the power developed by the engine falls off due to icing, the throttle plates are repositioned so that relatively constant power and r.p.m. conditions can be maintained throughout the one-minute high speed periods of the test cycle. The throttle control arm is operated in a manner which simulates, as closely as possible, foot pedal accelerator operation.

Examples of test results are shown in Table II for saturated solutions of the sparingly soluble type encompassed in this invention in commercial type gasoline. Saturated solutions for testing were made up in gallon jugs containing gasoline and a large excess of the slightly soluble additive. The jugs were up-ended many times and left for contact for a period of at least overnight. The following table gives the distillation sequence of the two fuels used in the test.

TABLE I.—A.S.T.M. DISTILLATION DATA

| | Fuel A (° F.) | Fuel B (° F.) |
|---|---|---|
| 10% | 115 | 110 |
| 20% | 135 | 116 |
| 30% | 152 | 127 |
| 40% | 172 | 142 |
| 50% | 196 | 165 |
| 60% | 223 | 200 |
| 70% | 250 | 237 |
| 80% | 283 | 280 |
| 90% | 327 | 220 |

When runs were made with untreated fuel for comparison, precautions were taken to assure that all the previous additive in the system was removed. Such removal of additives was effected by running the engine for a time in a 50/50 mixture of benzene and toluene. This highly aromatic mixture dissolves the additives pertinent to this invention much more readily than does normal gasoline. Test results are shown in Table II.

TABLE II

| Additive Phase Used to Saturate the Gasoline | Gasoline Used as Described in Table I | Number of Runs Made | Average Stalls per Five Cycles for these Runs | Average Stalls per Five Cycles for the Untreated Gasoline Before and/or After Runs |
| --- | --- | --- | --- | --- |
| Ethylene glycol | A | 3 | 8.7 | 16 |
| Propylene glycol | A | 3 | 0 | 16 |
| Polyethylene glycol [1] | A | 4 | 2.3 | 12 |
| Monoethanolamine | A | 2 | 0.5 | 14 |
| Diethylene glycol | A | 3 | 1.3 | 14½ |
| Diethanolamine | A | 3 | 8 | 12 |
| Aminoethylethanolamine | A | 2 | 2 | 14 |
| Diisopropanolamine (Solid) | A | 2 | 1 | 16 |
| Aircraft Deicing Fluid [2] | A | 2 | 0.5 | 10 |
| β,β'-Dihydroxyethyl sulfide | A | 3 | 2.0 | 12 |
| Propylene glycol | B | 3 | 7.3 | 16 |
| Diethylene glycol | B | 3 | 6.7 | 12 |
| Triethylene glycol | B | 3 | 0 | 18 |

[1] Molecular weight of 400.
[2] 5 percent water, 59.1 percent ethylene glycol, and 34.4 percent propylene glycol by weight plus corrosion inhibitors and a surfactant.

To further illustrate the value of the very small quantities of the additive, solutions were made up containing known quantities of propylene glycol. The fuel used was that identified as Fuel A above. The runs were made consecutively through the course of one day.

TABLE III

| Propylene glycol concentration (p.p.m.): | Engine stalls per 5 cycles |
| --- | --- |
| 0 | 8 |
| 0 | 12 |
| 500 | 0 |
| 500 | 0 |
| 500 | 0 |
| 150 | 0 |
| 150 | 0 |
| 150 | 0 |
| 150 | 5 |
| 150 | 3 |
| 0 | 12 |
| 0 | 16 |
| 0 | 12 |
| 100 | 4 |
| 100 | 5 |
| 100 | 3 |
| 100 | 6 |
| 0 | 12 |
| 0 | 8 |

It is apparent that a concentration of propylene glycol in gasoline of 150 p.p.m. gives excellent protection.

At temperatures below the freezing point of water, the formation of ice crystals can cause blocked fuel line filters consequently resulting in a potentially hazardous condition, particularly when occurring in aircraft engines. To determine which additives are efficient, a satisfactory test method must be employed.

In the engine fuel supply system of a jet aircraft the points which most frequently plug due to ice formation are the fuel filters. Thus, the filter plugging characteristics of a jet-engine fuel containing an anti-icing additive are a good measure of the effectiveness of said additive as an anti-icing agent.

The filter plugging temperature depression of a particular additive in a fuel composition is defined as the difference in the filter plugging temperature for the hydrocarbon which has been saturated with water at ambient temperature and which does not contain any additive, with the filter plugging temperature of the same fuel also saturated with water to which a given quantity of additive has been added. Sometimes a second condition of filter plugging is of concern. This second condition is one in which an excess of undissolved water is present in the fuel. Testing under these conditions, this property of an additive system is defined as the "filter plugging temperature depression of an additive system in the presence of excess water." The differential is the difference between the plugging temperature of fuel saturated with water at ambient temperature and the plugging temperature of the saturated fuel to which the additive and a known excess of water is added. The known excess of water in this illustration is the same for all comparisons between additives and is 0.05 percent by volume.

The following test procedure was employed for determining the filter plugging temperature of and the depressing effect of the addition of an additive to the filter plugging temperature. The test apparatus consists of a closed fuel circulating system and an acetone circulating system, the latter to provide the cooling effect. The fuel is pumped from a continuously stirred 2 liter reservoir through an acetone-Dry Ice bath using ¼ inch O.D. copper tubing. Dry Ice is periodically added to the bath to slowly decrease temperature. The rate of fuel flow is measured by a rotameter and is maintained constant; during the runs below the rate was maintained at 6 gallons per hour. Leaving the acetone-Dry Ice bath the fuel is conducted through ¼ inch O.D. tubing which contains a 200 mesh Monel screen as an in-line filter. The line then empties back into the fuel reservoir. A thermometer was placed immediately downstream of the screen to record the temperature at the screen. Dry Ice is added to the acetone bath so as to maintain the temperature of the bath no lower than 15° F. less than the temperature of the fuel at the screen. A water filled manometer capable of registering 14 inches without overflow was connected across the screen to measure the pressure drop. A typical pressure drop for the fuel at ambient temperatures was about 1.2 inches; as the temperature was decreased the pressure drop increased somewhat, as a result of the increased viscosity of the fuel. When the plugging temperature was reached and plugging occurred the pressure differential as recorded by the manometer increased rapidly. Simultaneously the temperature at the screen was recorded as the plugging temperature, and the run was terminated.

This procedure was conducted with the hydrocarbon fuel saturated with water, then the desired amount of additive was dissolved in the fuel in the reservoir and the run was repeated. Upon termination of the second run, 0.05 percent of excess water was added to the fuel and the filter plugging temperature of the fuel with excess water was determined. Between runs the fuel was warmed up by insertion of a portable steam coil in the fuel reservoir.

Test results appear in Table III.

TABLE III

| Additive | Volume Percent Additive | Plugging Temperature (° F.) | | | Depression of Plugging Temperature by Addition of Additive (° F.) $T_0$-$T_1$ | Depression of Plugging Temperature by Additive After Addition of 0.05 Vol. Percent Excess Water (° F.) $T_0$-$T_2$ |
|---|---|---|---|---|---|---|
| | | Water Saturated Fuel $T_0$ | Plus Additive $T_1$ | Plus additive and 0.05 Vol. Percent Excess Water $T_2$ | | |
| GASOLINE a | | | | | | |
| Ethylene Glycol | 0.01 | +10 | −6 | +6 | 16 | 4 |
|  | −0.01 | +12 | −11 | +8 | 23 | 4 |
|  | 0.01 | +11 | −8 | +7 | 19 | 4 |
|  | 0.01 | −4 | −36 | −20 | 32 | 16 |
| Propylene Glycol | 0.01 | +7 | −15 | -------- | 22 | -------- |
|  | −0.01 | +24 | +5 | +15 | 19 | 5 |
|  | 0.01 | +16 | −15 | +15 | 21 | 1 |
| Diethylene Glycol | 0.01 | −9 | <−62 | -------- | >53 | -------- |
|  | −0.01 | +23 | −31 | +5 | 54 | 18 |
|  | 0.01 | +12 | <−62 | −6 | >72 | 18 |
|  | 0.01 | −11 | <−63 | <−62 | >52 | >51 |
| Triethylene Glycol | 0.02 | +16 | −33 | 0 | 33 | 16 |
| Tetraethylene Glycol | 0.01 | +9 | −7 | +9 | 16 | 0 |
| Monoethanolamine | 0.01 | +15 | <−63 | −6 | >78 | 21 |
|  | 0.02 | +12 | <−63 | −19 | >75 | 31 |
|  | −0.03 | +12 | <−63 | −33 | >75 | 45 |
|  | 0.04 | +12 | <−63 | <−67 | >75 | 79 |
|  | 0.05 | +15 | <−63 | <−63 | >78 | 78 |
| JP-4 JET FUEL c | | | | | | |
| Ethylene Glycol | 0.01 | +5 | <−60 | −13 | >65 | 18 |
| Diethylene Glycol | 0.01 | +10 | <−60 | −17 | >70 | 27 |
| Propylene Glycol | 0.01 | +10 | <−60 | −7 | >70 | 27 |
|  | 0.01 | +12 | <−63 | −6 | >75 | 18 |
| Triethylene Glycol | 0.01 | +13 | <−63 | −8 | >76 | 21 | a Commercially available gasoline for automotive use.
b Fuel used in these runs was different brand of commercial gasoline.
c MIL-F-5624D.

What is claimed is:

1. A method for treating hydrocarbon fuels in fuel transport lines to prevent the formation of ice particles in the said fuel which comprises continuously dispersing the fuel through a separately maintained phase in the fuel line of an additive which is sparingly soluble in the fuel in sufficient amount in excess of that which is soluble so as to substantially saturate the hydrocarbon fuel with said additive and at the same time maintain a separate phase of said additive in contact with the substantially saturated fuel, the said additive being selected from the group consisting of ethylene glycol, polyethylene glycols having a molecular weight of up to 600, propylene glycol, monoethanolamine, diethanolamine, triethanolamine, monoisopropanolamine, diisopropanolamine, triisopropanolamine, amino-ethylethanolamine, and $\beta,\beta'$-dihydroxyethyl sulfide.

2. The method of claim 1 wherein the additive is ethylene glycol.

3. The method of claim 1 wherein the additive is a polyethylene glycol having from 2 to 6 repeating ethyleneoxy units.

4. The method of claim 1 wherein the additive is propylene glycol.

5. The method of claim 1 wherein the additive is monoethanolamine.

6. A method for treating hydrocarbon fuels in a fuel transport line to prevent the formation of ice particles in the said fuel which comprises, at a point in the fuel line, conducting the fuel through a scrubbing zone containing a separately maintained phase of a sparingly hydrocarbon-soluble additive selected from the group consisting of ethylene glycol, polyethylene glycols having a molecular weight of up to 600, propylene glycol, monoethanolamine, diethanolamine, triethanolamine, monoisopropanolamine, diisopropanolamine, triisopropanolamine, aminoethylethanolamine, and $\beta,\beta'$-dihydroxyethyl sulfide, into which scrubbing zone the fuel is continuously admitted at a point below the level of the said additive phase whereupon the fuel is dispersed through the additive phase, and rises through said additive phase so as to form a separate additive-containing fuel phase from which the fuel is withdrawn and continuously exits said zone.

7. The method of claim 6 wherein the scrubbing zone is interposed in the fuel line of an internal combustion spark ignition engine at a point prior to the carburetor.

References Cited

UNITED STATES PATENTS

| 1,980,097 | 11/1934 | Ruddies | 44—51 X |
| 2,840,461 | 6/1958 | Duncan et al. | 44—72 |
| 2,872,303 | 2/1959 | Donlan | 44—72 |
| 2,981,614 | 4/1961 | Lovett et al. | 44—56 |
| 3,240,578 | 3/1966 | Eckert | 44—56 |

FOREIGN PATENTS 727,820  4/1955  Great Britain.

DANIEL E. WYMAN, *Primary Examiner.*

W. J. SHINE, *Assistant Examiner.*

U.S. Cl. X.R.

44—76, 77